(12) United States Patent
Errickson et al.

(10) Patent No.: US 10,326,687 B2
(45) Date of Patent: *Jun. 18, 2019

(54) METHOD FOR REMOTE NODE DISCOVERY AND COMMUNICATION CHANNEL VALIDATION AND CONNECTION

(71) Applicant: INTERNATIONAL BUSINESS MACHINES CORPORATION, Armonk, NY (US)

(72) Inventors: Richard K. Errickson, Poughkeepsie, NY (US); Sean Liu, Brooklyn, NY (US); Michael Lyons, Poughkeepsie, NY (US); Peter K. Szwed, Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/840,600

(22) Filed: Dec. 13, 2017

(65) Prior Publication Data
US 2019/0020569 A1    Jan. 17, 2019

Related U.S. Application Data

(63) Continuation of application No. 15/647,561, filed on Jul. 12, 2017.

(51) Int. Cl.
*H04L 12/751* (2013.01)
*H04L 12/24* (2006.01)
(Continued)

(52) U.S. Cl.
CPC .......... *H04L 45/02* (2013.01); *H04L 41/0806* (2013.01); *H04L 41/08* (2013.01); *H04L 45/30* (2013.01); *H04L 45/42* (2013.01)

(58) Field of Classification Search
CPC .................... H04L 45/02; H04L 41/0806
See application file for complete search history.

(56) References Cited

U.S. PATENT DOCUMENTS 5,457,683 A    10/1995 Robins
7,961,729 B2    6/2011 Gainey, Jr. et al.
(Continued)

FOREIGN PATENT DOCUMENTS

CN    103828310 A    5/2014
CN    104158747 A    11/2014
(Continued)

OTHER PUBLICATIONS

Errickson, et al., "Method for Remote Node Discovery and Communication Channel Validation and Connection", U.S. Appl. No. 15/647,561, filed Jul. 12, 2017.
(Continued)

*Primary Examiner* — Ronald B Abelson
(74) *Attorney, Agent, or Firm* — Robert D. Bean (57) ABSTRACT

According to one embodiment, a method, computer system, and computer program product for computer networking is provided. The present invention may include a method of using media access control (MAC) multicast procedures to discover remote node addressability, and InfiniBand® (InfiniBand® and all InfiniBand® based trademarks and logos are trademarks or registered trademarks of System I/O, Incorporated and/or its affiliates) protocols to connect sets of queue pairs in implementing one or more communication channels, comprising preparing hardware to connect point-to-point links between a systems; discovering remote systems on the other side of the links through a discovery process; creating administrative traffic lanes; verifying the
(Continued)

US 10,326,687 B2

Page 2 connection between nodes; initiating the auxiliary traffic flow interface; negotiating and connecting buffers; and exchanging node descriptors.

7 Claims, 6 Drawing Sheets

(51) Int. Cl.
*H04L 12/725* (2013.01)
*H04L 12/717* (2013.01)

(56) References Cited

U.S. PATENT DOCUMENTS

| | | |
|---|---|---|
| 2003/0214938 A1 | 11/2003 | Jindal |
| 2005/0080933 A1 | 4/2005 | Herring |
| 2008/0005329 A1 | 1/2008 | Bauman et al. |
| 2008/0212473 A1* | 9/2008 | Sankey ............ G06F 11/00 |
| 2009/0157844 A1 | 6/2009 | Fionda et al. |

FOREIGN PATENT DOCUMENTS

| | | |
|---|---|---|
| CN | 104541314 A | 4/2015 |
| EP | 2661842 A1 | 11/2013 |
| WO | 2007120127 A2 | 10/2007 |
| WO | 2019012375 A1 | 1/2019 |

OTHER PUBLICATIONS

List of IBM Patents or Patent Applications Treated as Related. Filed Dec. 13, 2017. 2 pages.

Mell et al., "The NIST Definition of Cloud Computing," U.S. Department of Commerce, National Institute of Standards and Technology, Sep. 2011, p. 1-7, Special Publication 800-145.

International Search Report and the Written Opinion of the International Searching Authority, International Application No. PCT/IB2018/054942, International Filing Date Jul. 4, 2018, dated Oct. 31, 2018, 8 pages.

* cited by examiner

METHOD FOR REMOTE NODE DISCOVERY AND COMMUNICATION CHANNEL VALIDATION AND CONNECTION

BACKGROUND

The present invention relates, generally, to the field of computing, and more particularly to the field of computer networking.

Computer networking involves the connection of two or more computing devices with a data link to enable the computing devices to exchange data. Computer networks serve as the foundation of an enormous number of applications and services such as access to the internet, cloud storage, printers, fax machines, email, instant messaging, telephone service, and digital media, among many others. With the widespread proliferation of personal computing devices such as laptops and cell phones, computer networks have become a ubiquitous and crucial element of modern life. As such, advances in the maintenance and improvement of computer networking technology has the potential to yield pervasive benefits to modern society.

SUMMARY

According to one embodiment, a method, computer system, and computer program product for computer networking is provided. The present invention may include a method of using media access control (MAC) multicast procedures to discover remote node addressability, and InfiniBand® (InfiniBand® and all InfiniBand® based trademarks and logos are trademarks or registered trademarks of System I/O, Incorporated and/or its affiliates) protocols to connect sets of queue pairs in implementing one or more communication channels, comprising preparing hardware to connect point-to-point links between systems; discovering remote systems on the other side of the links through a discovery process; creating administrative traffic lanes; verifying the connection between nodes; initiating the auxiliary traffic flow interface; negotiating and connecting buffers; and exchanging node descriptors.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to computer networking. The following described exemplary embodiments provide a system, method, and program product to, among other things, uses media access control (MAC) multicast procedures to discover remote node addressability, and InfiniBand® (InfiniBand® and all InfiniBand® based trademarks and logos are trademarks or registered trademarks of System I/O, Incorporated and/or its affiliates) protocols to connect queue pairs in implementing one or more communication channels. Therefore, the present embodiment has the capacity to improve the technical field of computer networking by providing an in-band method of node discovery that is tolerant of switched environments.

As previously described, computer networking involves the connection of two or more computing devices with a data link to enable the computing devices to exchange data. Computer networks serve as the foundation of an enormous number of applications and services such as access to the internet, cloud storage, printers, fax machines, email, instant messaging, telephone service, and digital media, among many others. With the widespread proliferation of personal computing devices such as laptops and cell phones, computer networks have become a ubiquitous and crucial element of modern life. As such, advances in the maintenance and improvement of computer networking technology has the potential to yield pervasive benefits to modern society.

Many network connections utilize a standard set of protocols built into commercially available operating systems. These protocols are general and are the basis for the proliferation of network connectivity. However, such generality is at the expense of network performance. Systems that are sensitive to metrics such as network latency may opt to develop custom communication protocols that are not general, but are customized for a specific application and system's operating environment. Therefore, there exists a need for a method that uses node discovery in point to point links without the need for a centralized server, and transfers data based on fixed channels established via initial discovery rather than by use of channels created using a dynamic protocol.

According to one embodiment, a set of one or more channels is established between two systems by discovering remote addressability in-band using a multicast protocol, then establishing a directly connected administrative path over which remote channel definitions are validated and initialized.

In such an embodiment, a physical connection is first established between two server systems using a physical-layer protocol such as Ethernet, using a communication adapter that supports a transport-layer protocol such as InfiniBand® (InfiniBand® and all InfiniBand® based trademarks and logos are trademarks or registered trademarks of System I/O, Incorporated and/or its affiliates). Over that connection, the addressability of the remote system is obtained by setting up a local multicast queue pair (QP) to receive a multicast message containing the address of the connected port on the remote system, and to transmit a multicast message containing the address of the connected port on the local system.

When the remote port address has been obtained, it is used as a parameter to establish a directly connected admin QP with the remote system. The admin QP is used as path over which information is sent, such as the local and remote definitions of the channels, and parameters are negotiated such as the number of QPs comprising a channel.

For each channel that has a matching local and remote definition, the admin QP path is used to define and connect an auxiliary QP and a set of constituent buffer QPs. The auxiliary QP is used for channel-specific non-data messages (such as a message abort command), and the buffer QPs are used to send and receive data messages for the channel.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to establish a set of one or more communication channels between two computing systems by discovering remote addressability in-band using a multicast protocol, then establishing a directly connected administrative path over which remote channel definitions are validated and initialized.

Figure 1:
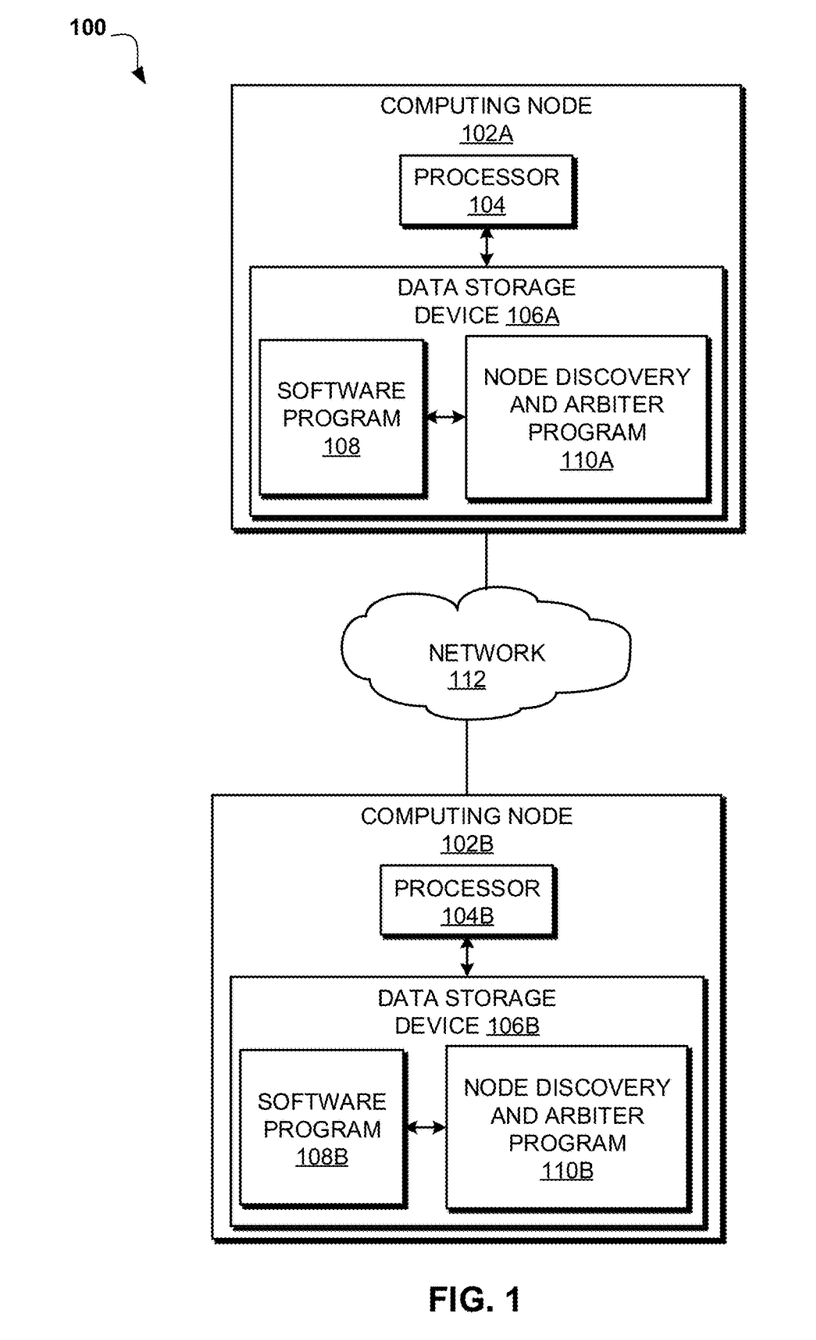
FIG. 1 illustrates an exemplary networked computer environment according to at least one embodiment.

Referring to FIG. 1, an exemplary networked computer environment 100 is depicted, according to at least one embodiment. The networked computer environment 100 may include network nodes 102A and 102B interconnected via a communication network 112. According to at least one implementation, the networked computer environment 100 may include a plurality of network nodes 102A, 102B, of which only two are shown for illustrative brevity.

The communication network 112 may include various types of communication networks, such as a wide area network (WAN), local area network (LAN), a telecommunication network, a wireless network, a public switched network and/or a satellite network. The communication network 112 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Network node 102A may include a processor 104A and a data storage device 106A, that is enabled to host and run a software program 108A and a node discovery and arbiter program 110A, and communicate with network node 102B via the communication network 112, in accordance with one embodiment of the invention. Network node 102A may be, for example, a mobile device, a telephone, a personal digital assistant, a netbook, a laptop computer, a tablet computer, a desktop computer, or any type of computing device capable of running a program and accessing a network. As will be discussed with reference to FIG. 5 the Network Node 102A may include internal components 502a and external components 504a, respectively. Network node 102A may also operate in a cloud computing service model, such as Software as a Service (SaaS), Platform as a Service (PaaS), or Infrastructure as a Service (IaaS). The network node 102A may also be located in a cloud computing deployment model, such as a private cloud, community cloud, public cloud, or hybrid cloud.

Network node 102B may include a processor 104B and a data storage device 106B, that is enabled to host and run a software program 108B and a node discovery and arbiter program 110B, and communicate with network node 102A via the communication network 112, in accordance with one embodiment of the invention. Network node 102B may be, for example, a mobile device, a telephone, a personal digital assistant, a netbook, a laptop computer, a tablet computer, a desktop computer, or any type of computing device capable of running a program and accessing a network. As will be discussed with reference to FIG. 5 the network node 102B may include internal components 502a and external components 504a, respectively. Network node 102B may also operate in a cloud computing service model, such as Software as a Service (SaaS), Platform as a Service (PaaS), or Infrastructure as a Service (IaaS). The network node 102A may also be located in a cloud computing deployment model, such as a private cloud, community cloud, public cloud, or hybrid cloud.

Software Program 108A, B may be any of a number of higher-level software programs that takes advantage of the connections established by the node discovery and arbiter program 110A, 110B.

According to the present embodiment, the node discovery and arbiter program 110A, 110B may be a program capable of performing a rendezvous function to discover the identity of a remote host node and using a multicast protocol, and to subsequently link sets of queue pairs for the purpose of data channel communication. The node discovery and arbiter method is explained in further detail below with respect to FIG. 2. In one embodiment, node discovery and arbiter program 110A, 110B is run in the device driver layer of the operating system for the computing nodes 102 A, B.

Figure 2:
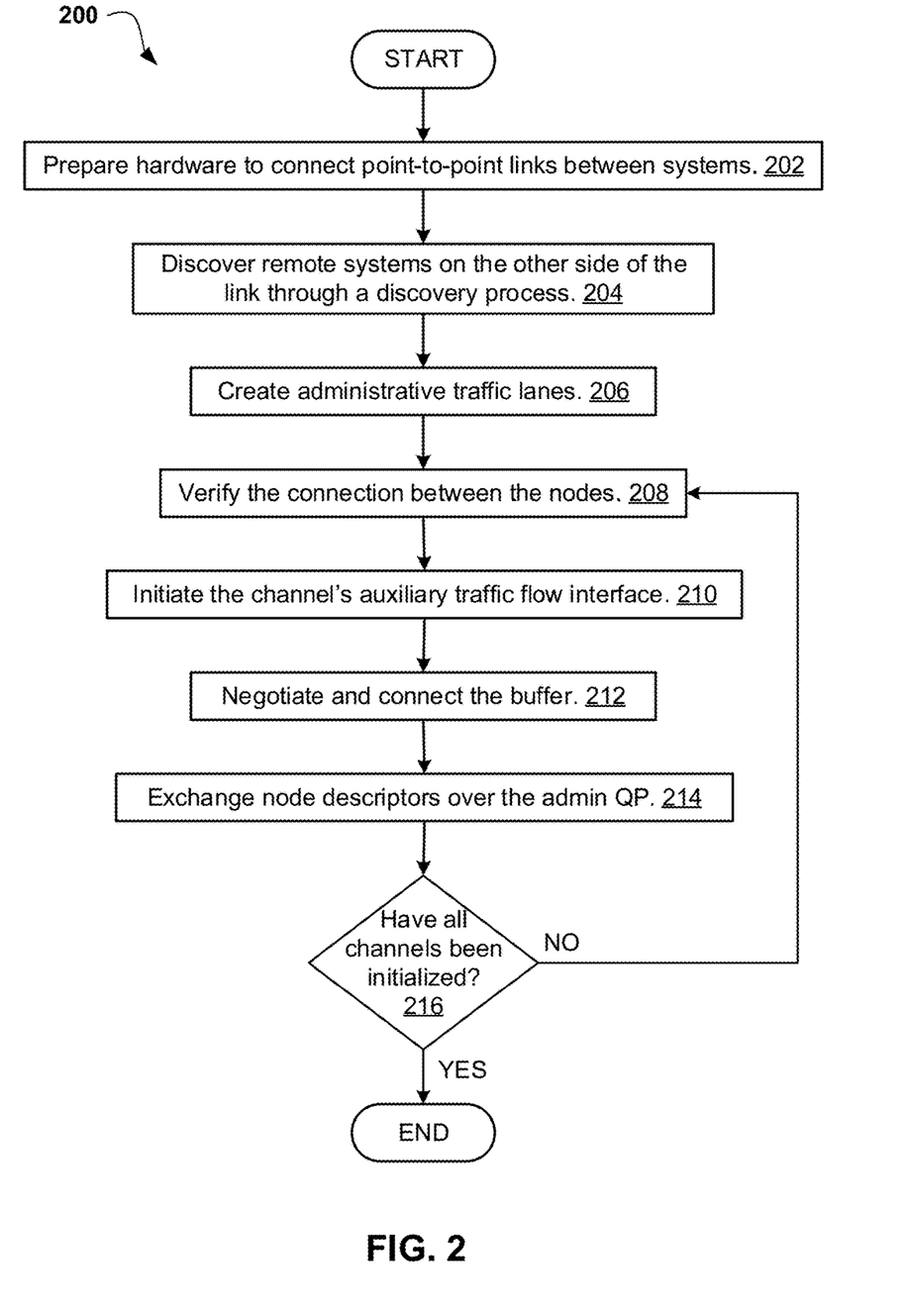
FIG. 2 is an operational flowchart illustrating a node discovery and arbitration process according to at least one embodiment.

Referring now to FIG. 2, an operational flowchart illustrating a method for remote node discovery and data channel initialization. At 202, the node discovery and arbiter program 110A, 110B prepares the hardware to connect point-to-point links between systems. This adapter initialization step may be divided into three stages; stage 1 may entail node discovery and arbiter program 110A, 110B triggering the function level reset on the virtual function employed by the adapter, in order to put the adapter into a known state. If there are no such channels defined for the adapter, then node discovery and arbiter program 110A, 110B may abort the initialization. Next, the node discovery and arbiter program 110A, 110B may enable the adapter for DMA transactions as well as MSI-X interrupts.

Stage 2 of the adapter initialization may entail node discovery and arbiter program 110A, 110B establishing the communication channel with which to pass commands to and from the adapter. Stage 3 of the adapter initialization may involve node discovery and arbiter program 110A, 110B querying the adapter for crucial hardware configuration information that may be used later on in commands to the adapter. Furthermore, node discovery and arbiter program 110A, 110B registers an event queue and memory protection table entry to become notified of events on the adapter and allow for remote direct memory access (RDMA) transactions. Node discovery and arbiter program 110A, 110B also reserves QPs at this time in allotments which are then broken into sets, where a data channel is comprised of a set of QPs. Node discovery and arbiter program 110A, 110B allocates the sets of QPs sequentially to provide simplification of the initialization and to tear down the flow interfaces. Once the adapter is primed for notifications, DMA's, interrupts, and other such traffic, node discovery and arbiter program 110A, 110B may establish the flow interfaces through which discovery, timing, and administrative and data traffic can flow.

In one embodiment of the invention, during stage 3 of the adapter initialization process, node discovery and arbiter program 110A, 110B may reserve buffer resources from the adapter upfront. Reservation of buffer pools is an expensive operation; in this embodiment, the buffer pool reservation operation may be performed only one time, during adapter initialization, which makes the resources available later for nimble allocation. In one embodiment, node discovery and arbiter program 110A, 110B conducts the buffer pool reservation using an interface called single-root in/out virtualization (SRIOV), which is a PCI Express extension that allows a device, such as a network adapter, to separately access its resources among various PCIe hardware functions. Under this interface, one device driver may be the administrative owner of the resources, and the network discovery and arbiter program 110A, 110B may be the guest.

Next, at 204, node discovery and arbiter program 110A, 110B discovers remote systems on the other side of the link through a discovery process. In order to perform the node/remote host discovery, node discovery and arbiter program 110A, 110B may use a multicast destination MAC address along with a proprietary payload. When a port comes up and host firmware has been configured, node discovery and arbiter program 110A, 110B may establish a QP, also known as a flow interface, and may periodically send out a message with the multicast MAC address and payload in the form of a raw Ethernet packet. In addition to bringing up the flow interface, node discovery and arbiter program 110A, 110B may configure the MAC address in the hardware in order to know when to forward the traffic with the specified MAC address. Once the remote host firmware is up and running the remote host may receive the Ethernet packet on this specified MAC address and place the payload into memory. The payload contains information about the remote side of the link and may be used to validate the connection. In addition to link information, to enable the sending of network traffic, node discovery and arbiter program 110A, 110B may send information that is used to arbitrate which side of the link will begin the higher-level initialization procedures. In one embodiment, this arbitration information may consist of timestamp data. Besides the arbitration information, the information sent via the payload may include: Ethernet address, global identifier, administrative QP number, Sysplex Time Protocol (STP) QP, remote direct memory access (RDMA) key info, and host firmware version. The Ethernet address and the group identifier (GID) may be the identifying information for sending directed network traffic both point to point and in a networked switch environment. Node discovery and arbiter program 110A, 110B may use the QP numbers and RDMA key info to translate where the packet should go once it has arrived at a particular end point adapter. Finally, the firmware version may be set in the control block and node discovery and arbiter program 110A, 110B may use the firmware version to identify supported code function.

Then, at 206, node discovery and arbiter program 110A, 110B creates administrative traffic lanes. The administrative traffic lanes may be communication channels for network traffic that provide generic pathing for whatever specific protocols might be necessary. This may include information gathering protocols such as a time synchronization protocol, or a sysplex wide logging protocol. In an alternate embodiment, the administrative lanes may utilize more than one initiation protocol, such as STP, which are not channel specific.

Steps 208 through 216 comprise the channel initialization procedure. Once all of the port level/administrative flow interfaces have been established in earlier steps, the next step is the channel initialization procedure. The entity that performs this channel initialization procedure is known as the channel initialization arbiter and may determine which channels are valid, are not in an error state or have been put in a threshold, and are in the right architectural state. For each defined channel, the channel initialization arbiter starts a timer and begins the channel initialization procedure, which comprises the steps of verify the connection, auxiliary queue pair connect, buffer connect, and node descriptor exchange.

At 208, node discovery and arbiter program 110A, 110B verifies the connection between the nodes. The verify connection stage serves to ensure that the node which node discovery and arbiter program 110A, 110B discovered is correct. The stage may first entail the action of the active side of the link, which node discovery and arbiter program 110A, 110B established using the arbitration information in the node discovery part of link initialization; first, node discovery and arbiter program 110A, 110B sends the local node's (active-side) definition of the channel to the remote node (passive-side). The channel definition may consist of the two identifiers known as the channel sub-system identification (CSSID) and channel path identifier (CHPID). At the passive side, the active side's channel information is crosschecked against the passive side's channel information. If the information matches, a positive response may be given, and the passive side's information may be sent over to the active side. If any of the information does not match, then a response code may be sent back to the active side to signify the error and a special error code may be sent up to the user. The verify connection packets are sent using the administrative QP.

Then, at 210, node discovery and arbiter program 110A, 110B initiates the channel's auxiliary traffic flow interface (AUX QP). This flow interface is used for channel-specific non-data information. Channel specific information includes heartbeat and small recovery actions to maintain this channel without affecting other channels on the port. Node discovery and arbiter program 110A, 110B establishes the AUX QP flow interface using the same connection procedure described in the next step. In addition to establishing the AUX QP flow interface, node discovery and arbiter program 110A, 110B selects a set of QPs that were previously reserved from the adapter, and allocates corresponding control memory regions. Node discovery and arbiter program 110A, 110B also establishes one completion queue which is used to notify the host firmware that some new packet has arrived on one of the QPs allocated for the channel, and must be processed.

Next, at 212, node discovery and arbiter program 110A, 110B negotiates and connects the buffer. In one embodiment, node discovery and arbiter program 110A, 110B utilizes a four-step process described as follows: initially, the host firmware of both the active and passive sides enumerate each kind of QP each needs to connect. Then, with this information, the firmware of either side connects each QP one by one. In order to negotiate the number of QPs to be used a message is sent, using the admin QP, from the active side to the passive side, containing the maximum number of QPs that it supports. The passive side then crosschecks the values with what it has, and if those values are the same, the passive side returns the values to the active side. If the values are not the same, then the lesser of the two values is returned to the active side. The active side then examines the QPs number it received, and then sequentially rolls through the negotiated number of QPs one at a time, establishing each QP in two stages per side. The QP on the active side is setup and initialized from the reset state, and then the active side sends a connection request over the administrative QP to the passive side, where the corresponding QP is initialized from the reset state. Once the passive side is finished, the passive side returns a connection response to the active side and the active QP is made ready to receive traffic, then made ready to send and resend a connection acknowledgement to the passive side. The passive side then performs the same two steps for its QP and returns a 'connection done' message to the active side, where the active side subsequently initializes the next QP connection.

Then, at 214, node discovery and arbiter program 110A, 110B exchanges node descriptors over the admin QP. This gives specific channel information to the other side and enables data traffic to begin. The information is a simple ping-pong message from the active side to the passive side and back. Once this step is complete, the channel is initialized and node discovery and arbiter program 110A, 110B conducts a test to make sure traffic can be sent and the channel is performing nominally and without error. Node discovery and arbiter program 110A, 110B may call the link initialization program at the backend to notify the software program 108A, B to the availability of the channel.

Then, at 216, the node discovery and arbiter program 110A, 110B program determines whether all of the defined channels have been initialized using the channel initialization arbiter function. Node discovery and arbiter program 110A, 110B makes this determination by traversing the list of defined channels. According to one implementation, the method may terminate if the channel initialization arbiter function determines that all channels have been initialized (step 216, "YES" branch). If the channel initialization arbiter function determines that not all channels have been initialized (step 216, "NO" branch), the node discovery and arbiter program 110A, 110B may continue to step 208 to restart the channel initialization procedure and verify the connection between the nodes.

Figure 3:
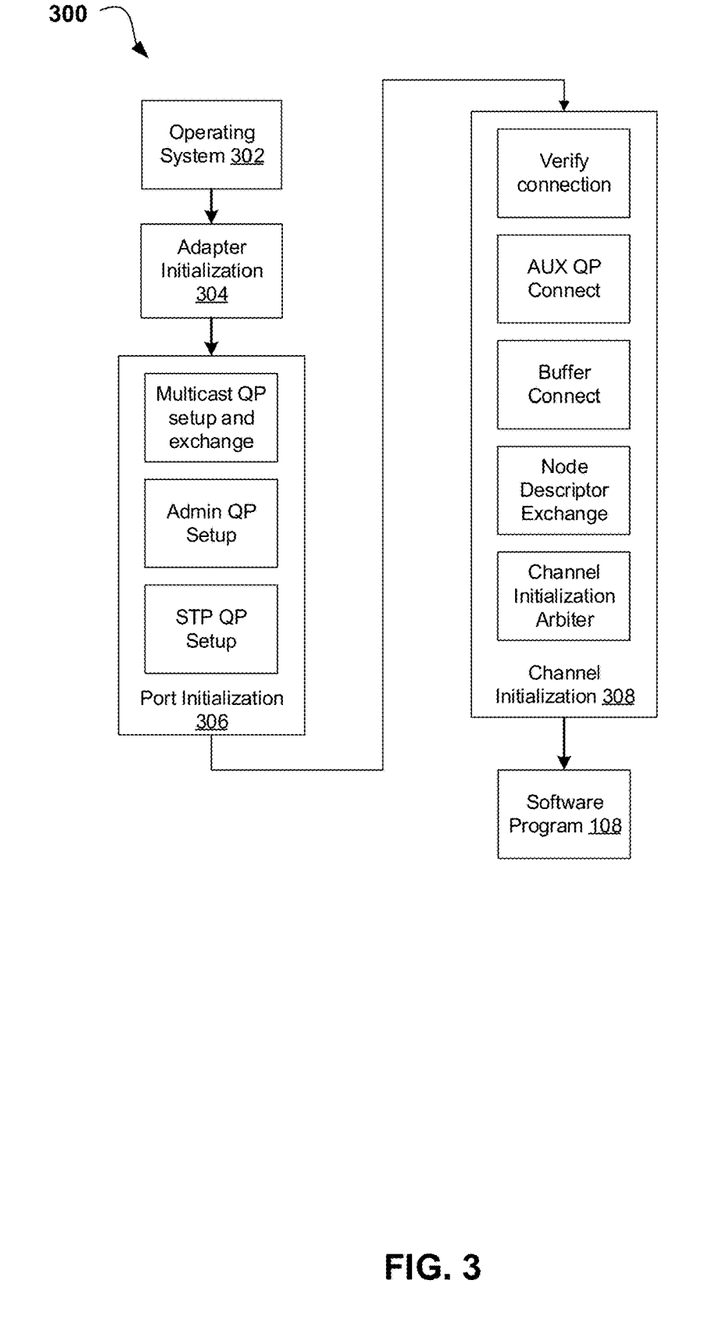
FIG. 3 is a functional block diagram illustrating a link initialization procedure according to at least one embodiment.

FIG. 3 is a functional block diagram illustrating a link initialization procedure according to at least one embodiment. The performance of adapter initialization 304 is described further in step 202 of FIG. 2. During adapter initialization 304 in one embodiment of the invention, Port initialization 306 is further described in steps 204 and 206 of FIG. 2. Channel initialization 308 is further discussed in steps 208 through 216 of FIG. 2. During channel initialization 308, the channel initialization arbiter is utilized to determine what channels are valid, are not in an error state or have been put in a threshold, and in the right architectural state. After channel initialization 308, the process hands off the newly created virtual channel to the software program 108.

It may be appreciated that FIGS. 2-3 provides only an illustration of one implementation and does not imply any limitations with regard to how different embodiments may be implemented. Many modifications to the depicted environments may be made based on design and implementation requirements.

Figure 4:
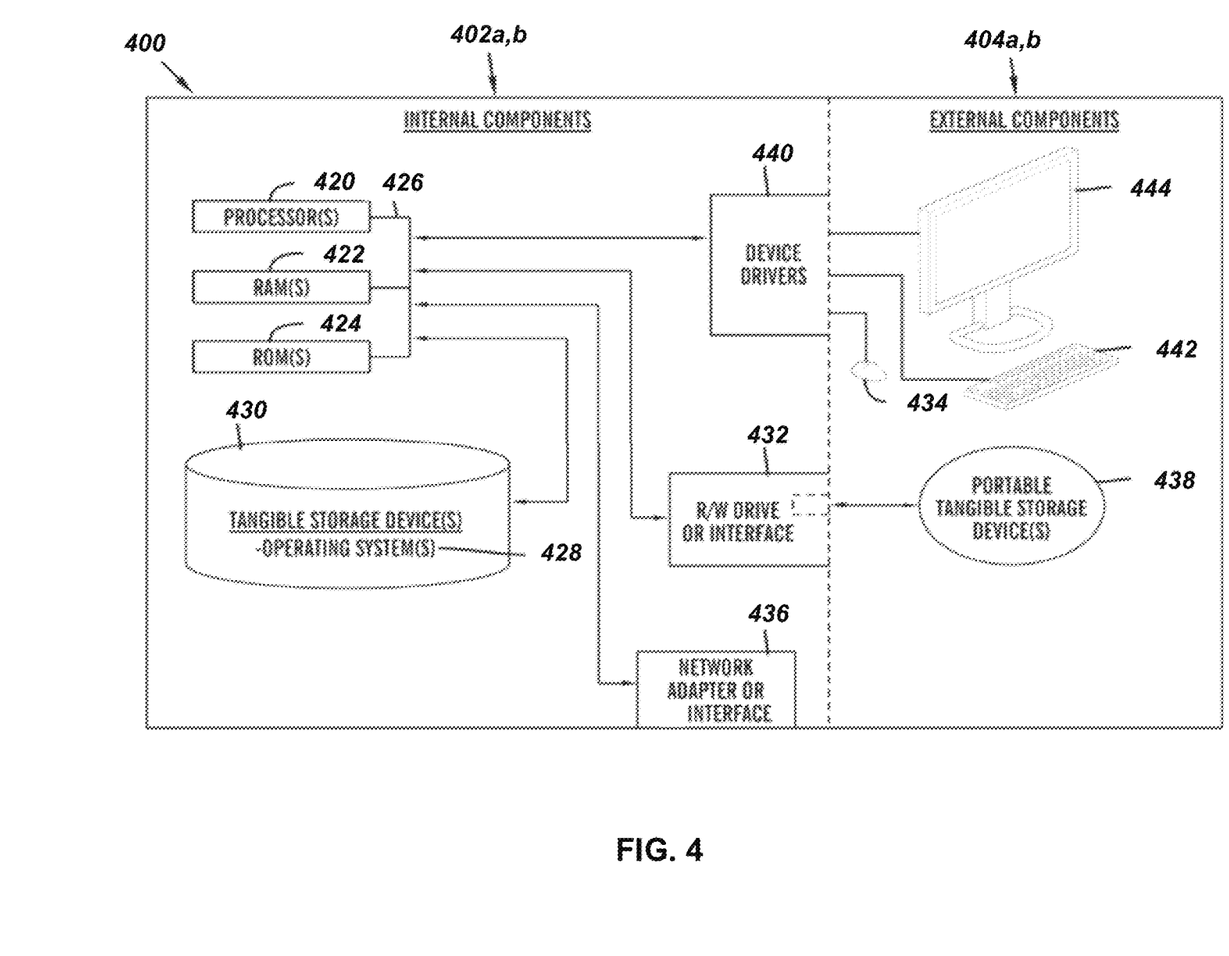
FIG. 4 is a block diagram of internal and external components of computers and servers depicted in FIG. 1 according to at least one embodiment.

FIG. 4 is a block diagram 400 of internal and external components of the Network Node 102A, 102B depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may be represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The Network node 102A, 102B may include respective sets of internal components 402 *a,b* and external components 404 *a,b* illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the node discovery and arbiter program 110A, 110B on the Network Node 102A, 102B, are stored on one or more of the respective computer-readable tangible storage devices 530 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 *a,b* also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the node discovery and arbiter program 110A, 110B, can be stored on one or more of the respective portable computer-readable tangible storage devices 438, read via the respective R/W drive or interface 432, and loaded into the respective hard drive 430.

Each set of internal components 402 *a,b* also includes network adapters or interfaces 436 such as a TCP/IP adapter cards, wireless Wi-Fi interface cards, or 3G or 4G wireless interface cards or other wired or wireless communication links. The software program 108 and the node discovery and arbiter program 110A, 110B in the Network Node 102A, 102B can be downloaded to the Network Node 102A, 102B from an external computer via a network (for example, the Internet, a local area network or other, wide area network) and respective network adapters or interfaces 536. From the network adapters or interfaces 436, the software program 108 and the node discovery and arbiter program 110A in the Network Node 102A, 102B are loaded into the respective hard drive 430. The network may comprise copper wires, optical fibers, wireless transmission, routers, firewalls, switches, gateway computers and/or edge servers.

Each of the sets of external components 404 *a,b* can include a computer display monitor 444, a keyboard 442, and a computer mouse 434. External components 404 *a,b* can also include touch screens, virtual keyboards, touch pads, pointing devices, and other human interface devices. Each of the sets of internal components 402 *a,b* also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
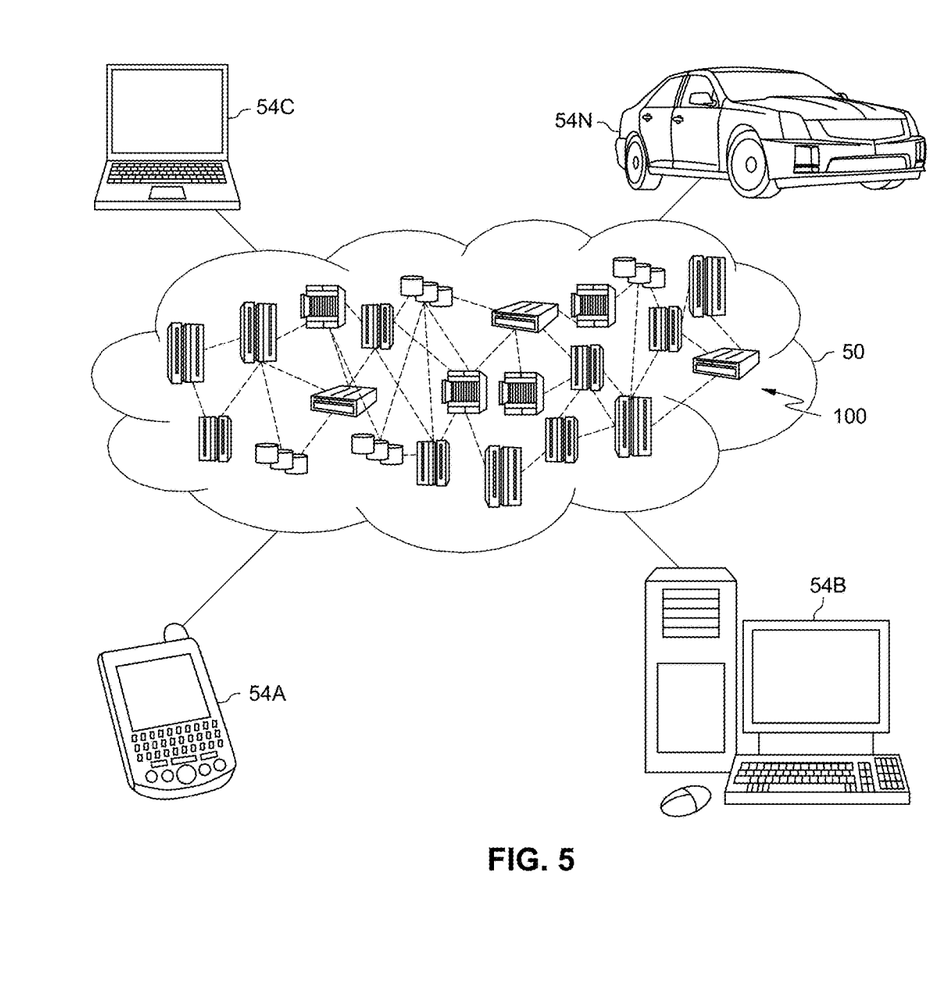
FIG. 5 depicts a cloud computing environment according to an embodiment of the present invention.

Referring now to FIG. 5, illustrative cloud computing environment 60 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
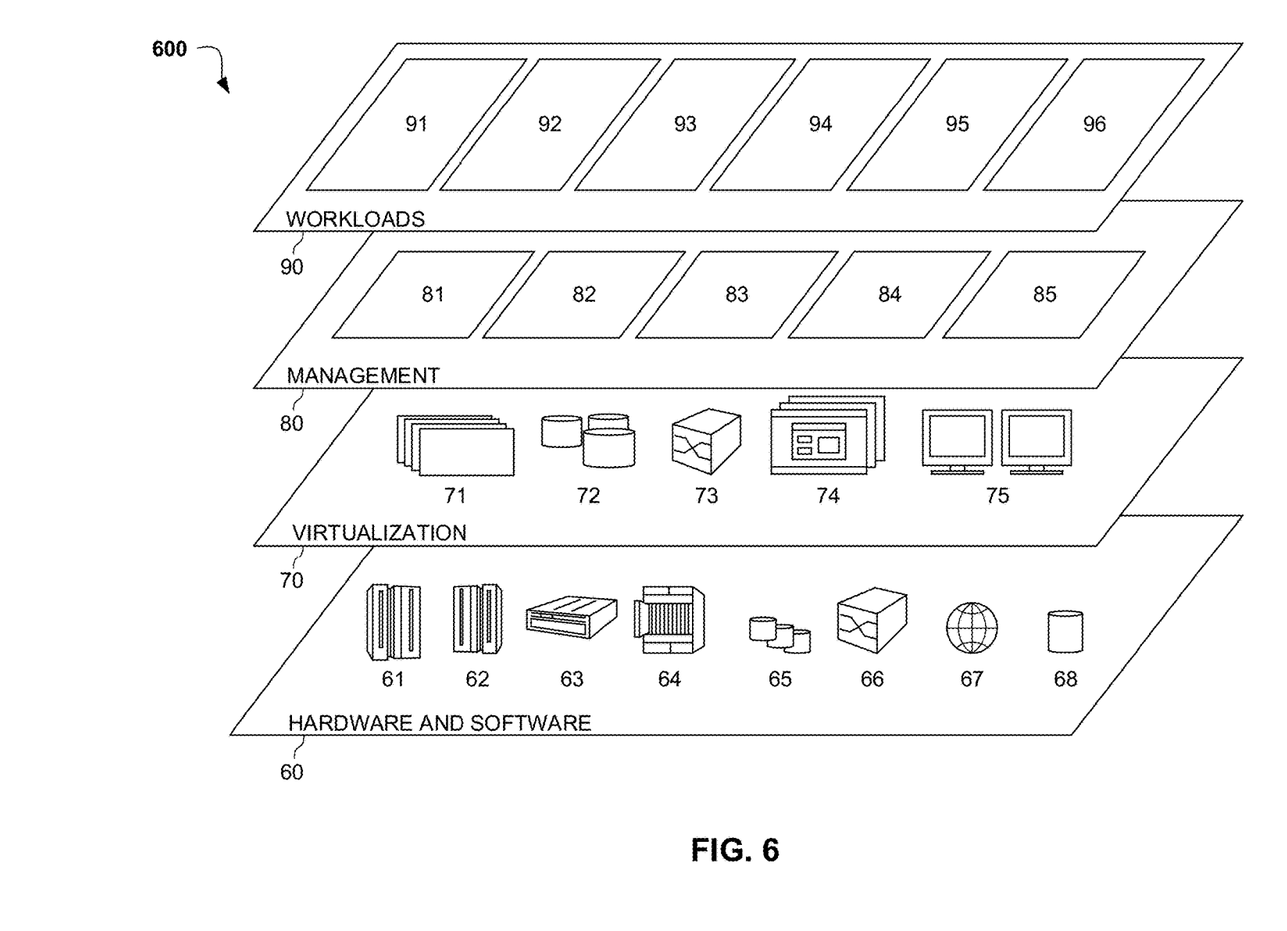
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and node discovery and arbiter method 96. Node discovery and arbiter method 96 may relate to using media access control (MAC) multicast procedures to discover remote node addressability, and InfiniBand® (InfiniBand® and all InfiniBand® based trademarks and logos are trademarks or registered trademarks of System I/O, Incorporated and/or its affiliates) protocols to connect sets of queue pairs in implementing one or more communication channels.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for remote node discovery and linking a plurality of queue pairs for communication channel implementation, the method comprising:
   preparing a plurality of hardware to connect one or more point-to-point links between a plurality of nodes;
   discovering the plurality of nodes within the one or more point-to-point links through a discovery process;
   creating a plurality of administrative traffic lanes between the plurality of nodes, wherein the plurality of administrative traffic lanes utilize a plurality of initiation protocols which are not channel specific;
   verifying a plurality of connections between the plurality of nodes;
   initiating one or more auxiliary traffic flow interfaces on the plurality of connections;
   negotiating and connecting a plurality of buffers for the plurality of connections; and
   exchanging a plurality of node descriptors between the plurality of nodes.

2. The method of claim 1, wherein the method is performed within a device driver layer.

3. The method of claim 1, wherein preparing a plurality of hardware to connect one or more point-to-point links between a plurality of nodes further comprises:
   reserving a plurality of buffer resources from the plurality of hardware upfront.

4. The method of claim 3, wherein the reservation of the plurality of buffer resources from the plurality of hardware upfront is conducted using a single-root in/out virtualization interface.

5. The method of claim 1, wherein a reservation of a plurality of buffer resources from the plurality of hardware is conducted once.

6. The method of claim 1, further comprising:
   utilizing a channel initialization arbiter function to ensure that all of a plurality of channels within the plurality of connections have been initialized.

7. The method of claim 1, wherein negotiating and connecting the plurality of buffers includes a four step queue pair connection process.

* * * * *